July 17, 1956  G. F. LUM  2,755,136
FIRE NOZZLE
Filed Sept. 21, 1955  2 Sheets-Sheet 1
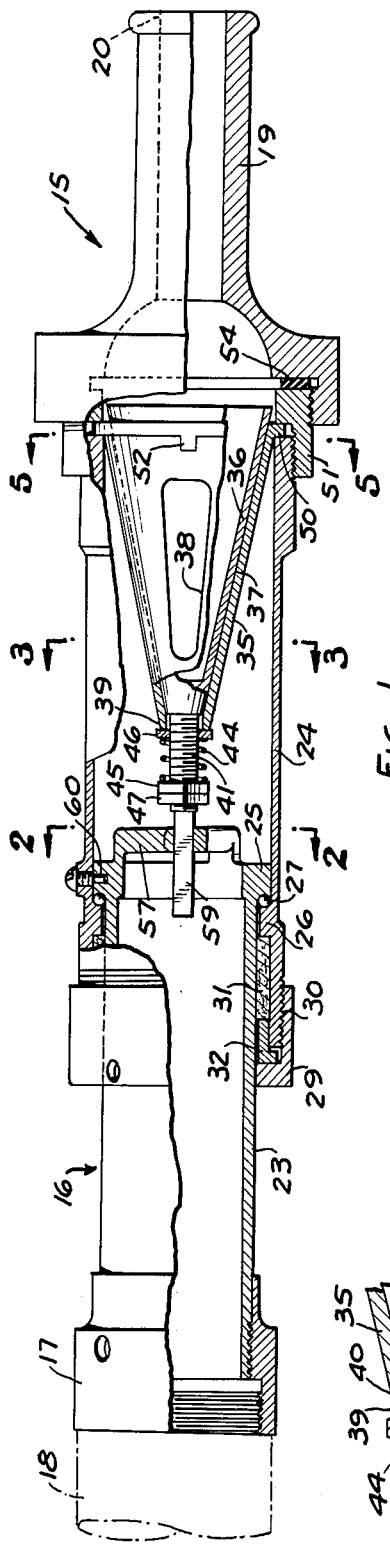
Fig. 1
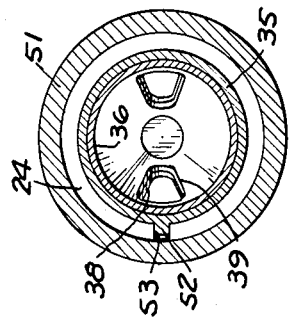
Fig. 5
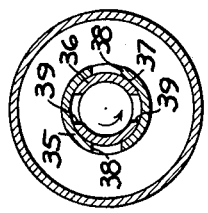
Fig. 4
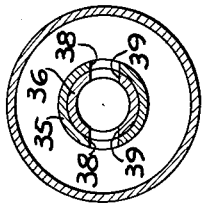
Fig. 3
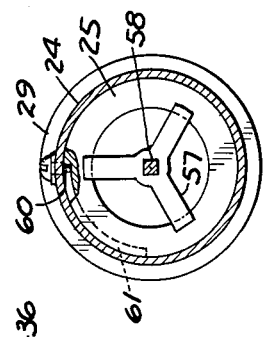
Fig. 2
Fig. 6
INVENTOR.
GEORGE F. LUM
BY
Barnes, Kisselle, Laughlin & Raisch
ATTORNEYS.

July 17, 1956 G. F. LUM 2,755,136
FIRE NOZZLE
Filed Sept. 21, 1955 2 Sheets-Sheet 2
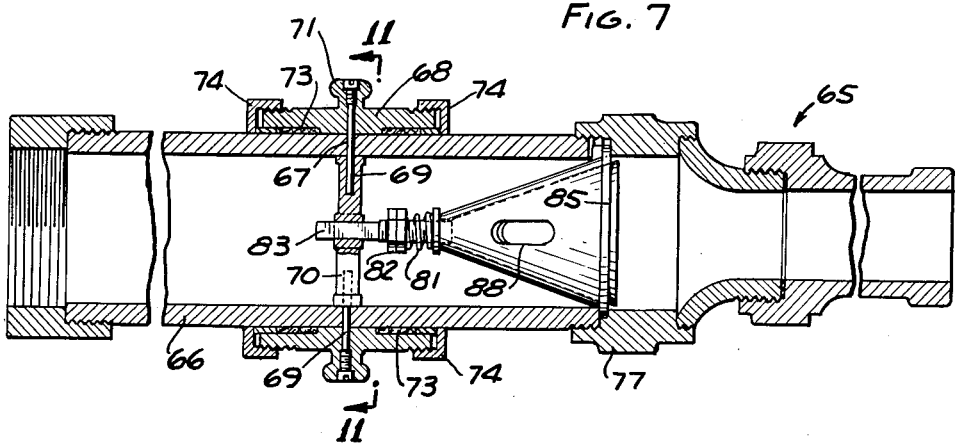
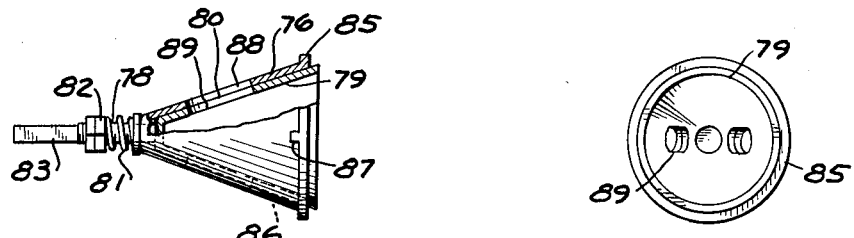
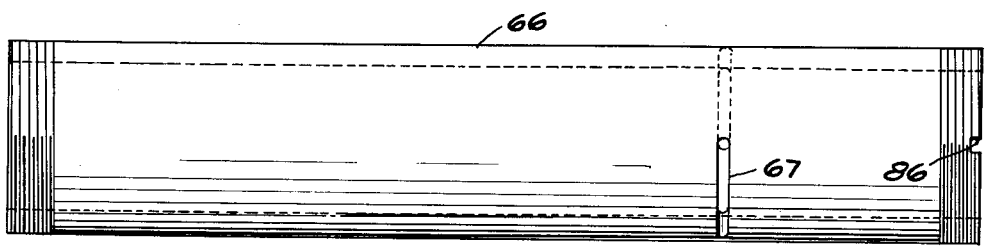
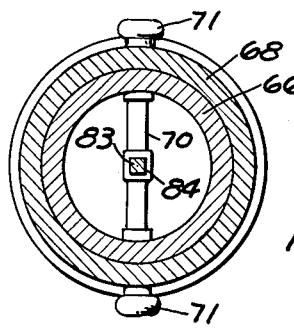
INVENTOR.
GEORGE F. LUM
BY
Barnes, Kisselle, Laughlin & Raisch
ATTORNEYS.

United States Patent Office 2,755,136
Patented July 17, 1956

2,755,136

FIRE NOZZLE

George F. Lum, Detroit, Mich.

Application September 21, 1955, Serial No. 535,707

7 Claims. (Cl. 299—151)

This invention relates to a nozzle for use on a high pressure fluid conduit such as a fire hose.

This application is a continuation-in-part of an application Serial No. 412,535, filed by this inventor on February 25, 1954, and entitled "Fire Nozzle."

Fire nozzles are usually adjustable to a closed position and to various open positions for providing selectively a heavy stream of water or a fine spray or fog through the outlet orifice.

An object of this invention is to provide a simple, inexpensive fire nozzle structure of this type having improved durability and improved sealing and operating characteristics.

The invention generally contemplates the use of two nested hollow conical valve members having sealing interfaces urged toward sealing engagement by an axially acting spring. The outer valve member has a cylindrical apex interior to receive the apex of the inner valve member so that if the interfaces should wear, the inner valve member may shift axially under the action of the spring, to retain the seal at the interfaces. Other features and objects of the invention appear in the detailed description.

In the accompanying drawings:

Fig. 1 is a side view partly in elevation and partly in section, illustrating a nozzle according to this invention.

Fig. 2 is a sectional view on line 2—2 of Fig. 1.

Fig. 3 is a sectional view on line 3—3 of Fig. 1 showing the valve in an open position.

Fig. 4 is a view similar to Fig. 3 but showing the valve in a closed position.

Fig. 5 is a sectional view on line 5—5 of Fig. 1.

Fig. 6 is an enlarged generally sectional view of the apices of the conical valve members.

Fig. 7 is a generally sectional view of a modified form of the invention.

Fig. 8 is a generally elevational view of the conical valve members of the modified form with parts broken away to illustrate structure.

Fig. 9 is an end view of the valve members shown in Fig. 8.

Fig. 10 is an elevational view of the body of the nozzle shown in Fig. 7.

Fig. 11 is a sectional view on line 11—11 of Fig. 7.

The nozzle 15 shown in Fig. 1 has a body 16 with a fitting 17 at one end adapted for threaded connection to a standard type fire hose 18 and has a nozzle tip 19 at its other end with a discharge orifice 20. Nozzle body 16 is formed of two axially overlapping tubes 23 and 24 rotatably interconnected preferably by aligned annular projections 25 and 26 thereon and an interposed ball bearing 27. A ring 29 around tube 23 is threaded onto tube 24 as at 30 and compresses packing material 31 between the tubes through an interposed packing gland 32.

A pair of hollow conical valve members 35 and 36 are mounted within nozzle body 16, the inner valve member 36 nesting rotatably within the outer valve member 35 and the valve members having sealing interfaces 37. Valve members 35 and 36 have oppositely disposed ports 38 and 39 therein, respectively. Outer cone 35 has an opening 40 at its apex and inner cone 36 has an axial stud 41 which projects through opening 40. Opening 40 has cylindrical form for a purpose to be described. A compressed coil spring 44 seats on a nut 45 threaded onto stud 41 and reacts against the apex of outer cone 35 to urge the cones axially toward each other to maintain a seal at interfaces 37. A washer 46 may be provided between spring 44 and cone 35 and a locking nut 47 may be tightened against nut 45.

Outer valve cone 35 has a radially outward flange 50 clamped to an end of outer tube 24 by a locking ring 51 threaded thereto. A key 52 engages within a slot 53 (Fig. 5) in the outer tube and to secure cone 35 against rotation relatively to tube 24. Nozzle tip 19 is threaded to ring 51 and a seal element 54 is provided therebetween. Tube 23 has an internal web 57 with a central rectangular opening 58 and a rectangular extension 59 on stud 41 fits nonrotatably therein. A pin 60 projects radially inwardly of tube 24 and engages in a slot 61 extending about 90° around the periphery of inner tube 23. The pin and slot provide for limited relative rotation of tubes 23 and 24.

In use, it may be assumed that fitting 17 on nozzle body 16 is attached to a hose 18 as described and that water under pressure is being supplied through the hose. The nozzle is opened, closed and adjusted to intermediate positions by turning tube 24 relatively to tube 23. Inner valve member 36 remains stationary because of its non-rotatable connection to tube 23 through interengaging projection 59 and opening 58 in web 57. Outer valve member 35 turns with tube 24 for turning ports 38 and 39 in the valve members into and out of registry. Nozzle body 16 is sealed by washer 54, packing 31 and by engagement of the faces on locking ring 51, flange 50 and the end of tube 24.

To provide a heavy solid stream of water through orifice 20, the valve members are rotated to a position where their ports 38 and 39 are in full registry. This position of the nozzle is shown in Figs. 1, 2, 3 and 5. Pin 60 is engaged against an end of slot 61 to limit relative movement of tubes 23 and 24 at this position. Water flows through the nozzle body, through the oppositely disposed valve ports and out of the nozzle through tip 19 and orifice 20. The oppositely disposed valve ports provide for an even, balanced flow of water through the nozzle.

To close the nozzle, tube 24 and outer valve cone 35 are rotated about 90° counterclockwise as Fig. 2 is viewed until pin 60 engages the other end of slot 61 so that ports 38 and 39 are turned completely out of registry as shown in Fig. 4. The nozzle may be adjusted to intermediate positions with the valve ports in partial registry to provide finer spray or fog through orifice 20.

During use, compressed spring 44 acts on nut 45 and the apex of the outer valve cone to urge the inner valve cone axially toward its nested position to hold interfaces 37 in sealing engagement. The interfacial pressure may be adjusted from time to time as desired by turning nut 45 to regulate the stress in spring 44. Locking nut 47 is operated in the usual manner to secure nut 45 in its adjusted position.

Wear may occur at interfaces 37 after use of the nozzle over a period of time. Ordinarily, this would loosen the engagement of interfaces 37 and destroy their sealing effectiveness. In the present structure inner cone 36 merely shifts axially inwardly of outer cone 35 under the action of spring 44 with the apex of the inner cone shifting into the enlarged cylindrical opening 40 at the apex of the outer cone. Thus, interfaces 37 are maintained in tight sealing engagement despite wear on the cones.

The modified form of the invention shown in Figs. 7–11 is similar to the principal form except that the nozzle 65 has a body 66 formed of a single tube with 90° circumferential slots 67 therein. A ring 68 is rotatably mounted around tube 66 and has pins 69 projecting through the slots and fastened to a web 70 rotatable within the tube. Ring 68 has projections 71 forming finger holds, as shown. Packing 73 provided between the tube and ring 68 is compressed by packing rings 74 threaded onto the ring as shown to form a seal at slots 67.

The nozzle has a nesting cone valve structure having an outer flanged cone 76 secured non-rotatably to tube 66 by a locking ring 77. A flange 85 on the outer cone is engaged between the body 66 and the ring 77 and the body 66 has a notch 86 to receive key 87 on the outer cone. The outer cone has an opening for the axial stud 78 on the inner cone 79. The cones have sealing interfaces 80 which are urged together by spring 81 adjustable by nut 82 and they have opposite openings 88 and 89 arranged to be brought into and out of registry. Inner cone 79 is non-rotatably secured to web 70 by a rectangular extension 83 of stud 78 which fits in a rectangular opening 84 in the web.

One advantage of the invention is that the nozzle will not plug up with extraneous material. This is because when the large ports are aligned such material easily passes therethrough. This is an important consideration when the water is pumped from a cistern or other reservoir or pumped from a river, lake, stream, or well. There are instances, too, where scale from an inside of a tank is liable to plug up a nozzle but such scale or other foreign matter will readily pass through the nozzle of this invention.

Use of this form of the invention is similar to use of the principal form, the valve cones being adjusted relatively to each other by turning collar 68 relatively to tube 66.

I claim:

1. A nozzle comprising, a body adapted to be connected to a conduit for fluid under pressure, said body having an outlet orifice, said body including two elements rotatable relatively to each other, a pair of relatively rotatable hollow conical valve members within said body, one valve member nesting within the other so that said valve members have sealing interfaces, each of said valve members having generally oppositely disposed ports therein, each of said valve members being rotationally fixed to one of said body members so that said ports may be selectively turned to and from registry by turning said body members, whereby to control the flow of fluid through said outlet orifice, and stressed spring means arranged to act axially on one of said valve members and to react axially on the other valve member, said spring means being operative to hold said interfaces in sealing engagement.

2. A nozzle comprising a body adapted to be connected to a conduit for fluid under pressure, said body having an outlet orifice, said body including two elements rotatable relatively to each other, a pair of relatively rotatable hollow conical valve members within said body, one valve member nesting within the other so that said valve members have sealing interfaces, each of said valve members having generally oppositely disposed ports therein, the outer of said valve members being rotationally fixed on one of said body elements and having an opening at its apex, the other of said valve members being rotationally fixed on another of said body elements, said other valve member having an extension projecting axially movably through said opening, said extension being rotationally fixed to the other of said body elements so that said ports may be selectively turned to and from registry by turning said body elements, whereby to control the flow of fluid through said outlet orifice, a stressed coil spring seating on the apex end of said one valve member, said spring reacting against projecting means on said extension, said spring being operative to hold said interfaces in sealing engagement.

3. A nozzle comprising, a body adapted to be connected to a conduit for fluid under pressure, said body having an outlet orifice, said body including two elements rotatable relatively to each other, a pair of relatively rotatable hollow conical valve members within said body, one valve member nesting within the other so that said valve members have sealing interfaces, each of said valve members having generally oppositely disposed ports therein, the outer of said valve members being rotationally fixed on one of said body elements and having an opening at its apex, the inner of said valve members having an axial extension projecting axially movably through said opening and being rotationally fixed on the other of said body elements so that said ports may be selectively turned to and from registry for controlling the flow of fluid through said outlet orifice, stressed spring means arranged and constructed to urge said valve members axially toward each other so that said interfaces are urged toward and held in sealing engagement, the interior of said outer valve member adjacent said opening being enlarged to receive the apex end portion of said inner valve member, so that said inner valve member can shift axially toward said outer valve member under the action of said spring means when wear occurs at said interfaces, whereby to maintain said interfaces in sealing engagement.

4. The nozzle defined in claim 3 wherein the interior of said outer valve member adjacent said opening therein has generally cylindrical form.

5. A nozzle comprising, a body adapted to be connected to a conduit for fluid under pressure, said body having an outlet orifice, said body being formed of two overlapping tubes rotatably secured together, a pair of relatively rotatable hollow conical valve members within said body, one valve member nesting within the other so that said valve members have sealing interfaces, each of said valve members having generally oppositely disposed ports therein, the outer of said valve members being rotationally fixed on the outer of said tubes and having an opening at its apex end, the inner of said tubes having an internal web, the inner of said valve members having an axial projection extending movably through said opening and being rotationally fixed on said web so that said ports can be selectively turned to and from registry for controlling the flow of fluid through said outlet orifice by turning said tubes relatively to each other, spring means arranged and constructed to urge said valve members axially toward each other so that said interfaces are urged toward and held in sealing engagement, the interior of said outer valve member adjacent said opening being enlarged to receive the apex end portion of said inner valve member so that said inner valve member can shift axially toward said outer valve member under the action of said spring means when wear occurs at said interfaces, whereby to maintain said interfaces in sealing engagement.

6. A nozzle comprising, a tubular body adapted to be connected to a conduit for fluid under pressure, said body having an outlet orifice, rotatable ring means around said body, circumferential slot means in said body, pin means on said ring means projecting through said slot means, a rotatable web within said body secured to said pin means, a pair of relatively rotatable hollow conical valve members within said body, one valve member nesting within the other so that said valve members have sealing interfaces, each of said valve members having generally oppositely disposed ports therein, the outer of said valve members being rotationally fixed to said body and having an opening at its apex, the inner of said valve members having an axial projection extending movably through said opening and being rotationally fixed on said web so that said ports may be selectively turned to and from registry for controlling the flow of fluid through said outlet orifice by turning said ring means relatively to said body, spring means arranged and constructed to urge said valve members axially toward each other so that said interfaces are urged toward and held in sealing engagement, the interior of said outer valve member adjacent said opening being enlarged to receive the apex end portion of said inner valve member, so that said inner valve member can shift axially toward said outer valve member under the action of said spring means when wear occurs at said interfaces, whereby to maintain said interfaces in sealing engagement.

7. A nozzle for controlling the outlet of water supplied from a source under pressure comprising, a body member adapted to be connected to the source of supply, means providing an outlet orifice, two valve members positioned in the body member, said valve members being of hollow conical form and one positioned within the other with sealing interfaces, means fixedly securing the outer of the valve members to the body member, the outer member being open at its apex, the inner member having an extension at its apex projecting through said opening, spring means interposed between the extension of the inner member and the apex end of the outer member to hold the interfaces in tight sealing engagement, said valve members each having a pair of oppositely disposed apertures arranged to be brought into and out of registry by the turning of the inner valve member relative to the outer valve member, an operating member engageable outside of the body and having limited rotational movement relative to the body member, and means including a member slidably and non-rotatably connected to the extension of the inner valve member and connected to the operating member for turning the inner valve member relative to the outer valve member.

References Cited in the file of this patent

UNITED STATES PATENTS

| | | |
|---|---|---|
| 157,655 | Turnock | Dec. 8, 1874 |
| 1,789,390 | Potteiger | Jan. 20, 1931 |

FOREIGN PATENTS

| | | |
|---|---|---|
| 13,761 | Germany | 1881 |
| 360,378 | France | 1926 |